(12) United States Patent
Tsao et al.

(10) Patent No.: US 6,281,931 B1
(45) Date of Patent: Aug. 28, 2001

(54) METHOD AND APPARATUS FOR DETERMINING AND CORRECTING GEOMETRIC DISTORTIONS IN ELECTRONIC IMAGING SYSTEMS

(76) Inventors: Tien Ren Tsao, 12405 Vernice Pl., Silver Spring, MD (US) 20904; Xiangyang Yang, 10806 Maple Crest La., Potomac, MD (US) 20854

( * ) Notice: Subject to any disclaimer, the term of this patent is extended or adjusted under 35 U.S.C. 154(b) by 0 days.

(21) Appl. No.: 08/964,402

(22) Filed: Nov. 4, 1997

(51) Int. Cl.[7] ................................. H04N 9/64; H04N 9/74
(52) U.S. Cl. ................ 348/247; 348/250; 348/580; 382/275; 382/293
(58) Field of Search ............................ 345/433, 437; 382/275, 276, 289, 293–300; 348/241, 246, 247, 250, 578, 580, 581, 583; H04N 9/74, 9/64, 5/217

(56) References Cited

U.S. PATENT DOCUMENTS

| | | | |
|---|---|---|---|
| 5,175,808 | * 12/1992 | Sayre | 382/293 |
| 5,276,519 | * 1/1994 | Richards | 348/241 |
| 5,675,380 | * 10/1997 | Florent | 348/247 |
| 5,686,957 | * 11/1997 | Baker | 348/580 |
| 5,706,362 | * 1/1998 | Yabe | 382/275 |
| 5,818,527 | * 10/1998 | Yamaguchi | 348/241 |
| 6,005,611 | * 12/1999 | Gullichsen | 211/26 |
| 6,035,075 | * 3/2000 | Inoue | 382/293 |
| 6,061,477 | * 5/2000 | Lohmeyer | 382/293 |

* cited by examiner

*Primary Examiner*—Wendy R. Garber
*Assistant Examiner*—Ngoc-Yen Vu (57) ABSTRACT

A method and apparatus is provided to determine geometric distortion of an electronic imaging system, and an apparatus is provided to correct geometric distortion of the electronic imaging system and generate geometric distortion-corrected images. The novel geometric distortion measurement system comprises a light source, a collimator, a two dimensional steering device including a driver, and a control device for automatic sampling of the geometric distortion mapping of the electronic imaging system, and writes the results of distortion sampling into an associative memory. The sampling comprises multiple examples of the geometric distortion mapping across the image plane. Each example includes an ideal position of image pixel and its actual registration on the image plane. The measuring device take one example at a time until the whole sample is accomplished. The geometric distortion correction system utilizes associative memory to revise intensity arrays and generates geometric distortion-corrected images by using geometric interpolation and intensity interpolation methods.

12 Claims, 8 Drawing Sheets

FIG. 1

PRIOR ART

FIG. 2

PRIOR ART

FIG. 3

PRIOR ART

METHOD AND APPARATUS FOR DETERMINING AND CORRECTING GEOMETRIC DISTORTIONS IN ELECTRONIC IMAGING SYSTEMS

BACKGROUND OF THE INVENTION

1. Field of the Invention

The invention relates to apparatus and methods for determining and correcting geometric distortion in electronic imaging systems and, particularly, to a novel method for using electronic imaging in taking distortion-corrected images.

2. Description of the Related Art

Electronic imaging systems, such as digital cameras and infrared (IR) focal plane array imaging systems, have many photogrammetric applications in geological survey, traffic accident investigations, diagnosis and treatment in medicine, robotics, automatic manufacturing, military surveillance, and weapons targeting systems.

Figure 1:
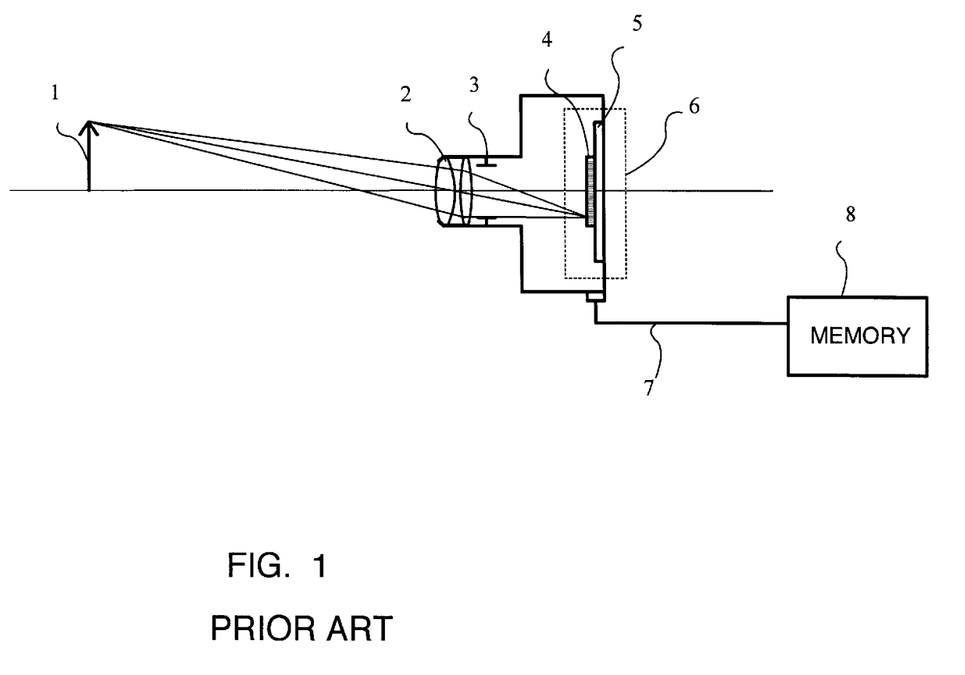
FIG. 1 is a schematic diagram of a typical electronic camera generating electronic images through its opto-electronic intensity sensor array.

With reference to FIG. 1, there depicted a diagram of a digital camera. Light from the surface of object 1 passing through an optical lens 2, forms image on a two dimensional (2-D) intensity sensor array 4 in the 2-D image detector array unit 6 when the shutter 3 is open. The sensing array 4 comprises multiple opto-electronic sensors. The intensity signals excited by impinging lights then are recorded in an on-chip memory buffer 5, which is also in the 2-D image detector array 6, and then are output via a data link 7 to another memory 8 for post processing.

Figure 2:
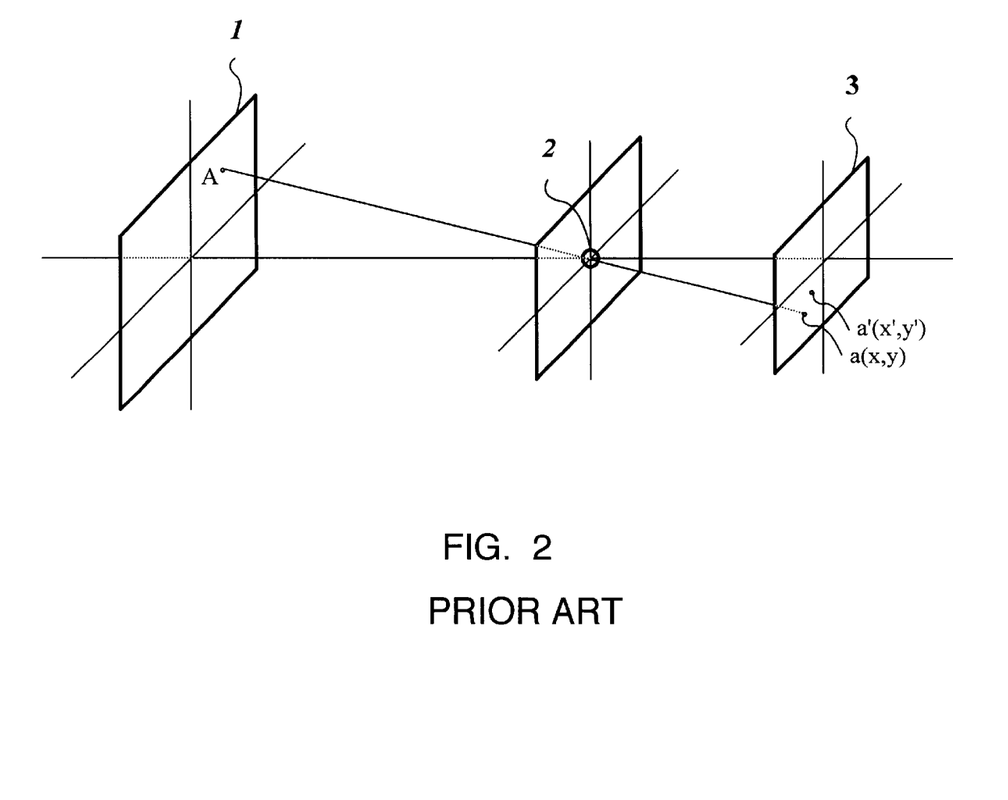
FIG. 2 is a schematic diagram of the pin-hole projection model, in which light path from an object point is projected by the optic lens (represented by the pin-hole in the figure) to the focal (image) plane.

Ideally, image forming in a camera can be modeled as "pin-hole" projections. FIG. 2 depicts an object point A at object plane 1 to be projected to image point a on the image plane 3 according to the pin-hole camera model. With the presence of distortion caused by lens and the opto-electronic sensor array, which hereafter will be simply termed as geometric distortion, the actual location of the image of the object point will be at a' on the same image plane. In general, the electronic imaging system components, mainly the lens and the sensor array, defines a mapping on the image plane:

$$L:(x,y) \rightarrow (x',y')$$

where (x, y) is the coordinate of the ideal location a on the image plane in the camera intrinsic coordinate system according to the pin-hole projection, and (x', y'), is the actual coordinate of actual image point a' of A found on the image in the same intrinsic coordinate system. The coordinate of the actual image point a' is a function of the ideal projection a of A: $x'=l_x(x, y)$ and $y'=l_y(x, y)$. The 2-D mapping $L(x, y)=(l_x(x, y), l_y(x, y))$ from ideal locations of all visible scene points in the field of view to their actual image registration locations will be termed the geometric distortion mapping, or simply distortion mapping, of the electronic imaging system.

The cameras for photogrammetric measurements are required to have nearly perfect geometric optic performances. Even slight geometric distortion might cause great error in measurements.

Traditionally, high quality lenses or combination lenses are used to reduce the distortion. Today, distortions in high quality combination lenses have been reduced to such negligible amounts that they are often referred to as distortion-free lenses.

In a film camera, the sensing is achieved through chemical changes of continuously spread coating material in direct response to the projected light. In this case, the correction of distortion caused by the lens must be a process happening before the light reaches the film. Once the light reaches the film, the geometric distortion will appear in the photograph and it will be too late to correct it. In this case, the optical means including using high quality lens or combination lenses appears the only viable method to correct the geometric distortion in the images. The optical means of lens perfection will be referred as the pre-imaging correction of geometric distortion. The distortion-free lenses are difficult to fabricate and very expensive.

In photogrammetry, there are available means of calibration and correction to overcome the effect of geometric distortion. For example, in the textbook by Wolf, Paul R. (1974) *Elements of Photogrammetry*, McGRAW-HILL BOOK COMPANY, New York, and earlier in the paper by Duane C. Brown ("*Advanced Methods for Calibration of Metric Cameras*", for 1969 Symposium on Computational Photogrammetry), methods for calibrating lens parameters and making measurement corrections were described. These correction methods do not change the photographs. The correction process only change the assignments of the coordinates of the image points on the photographs. The image points with corrected coordinates can be used in photogrammetric calculations with reduced distortion error. The computer process of calibration and correction will be referred as the post-imaging correction of lens distortion.

Based on the models of particular types of lens imperfection with regard to geometric optics and the calibrated parameters describing such imperfection, numerical scheme can be derived to calculate the amount of distortion error at each location of a photograph. No matter how precise the calibration is, and how accurate the lens distortion model is, the post-imaging correction process does not improve image geometric quality. It only brings benefits to photogrammetric measurements.

Besides the lens distortion, in electronic imaging systems there exists another important source of geometric distortion, the sensor array irregularities. The above mentioned methods for reducing the geometric distortions in image measurements, by improving the lenses or by accurate calibration and analytical corrections, are only effective for lens distortions.

Unlike the conventional optical camera wherein the photographic film is the image recording media, in a digital camera, with reference to FIG. 1, a two-dimensional (2-D) array 4 of light sensing elements is used to detect the spatial light intensity distribution on the image plane. Many types of 2-D image sensing array have developed over the last 30 years. For example, charge coupled device (CCD) array is the widely used one in current digital cameras. The sensor arrays of the electronic imaging systems usually are not as flat and smoothly surfaced as the films. Once the sensor array is made, it will be difficult to change its geometric shape. Thus, besides the lens distortion, the electronic imaging systems usually have another source of geometric distortion: the sensor array distortion. The analytical correction schemes based on lens optical paths, such as D. C. Brown's, are not adequate for electronic imaging systems.

In recent years, there emerge some sampling-based methods of geometric distortion correction for using digital cameras in measurement in laboratories. The sampling-based method performs a set of experiments on image areas where image distortion is to be corrected. The set of experiments is performed to collect a sample of the geometric distortion mapping.

More specifically, the sampling-based method uses some distinguishable feature points with known object location which allows calculation of ideal, undistorted position on the image. The "ideal positions" and the actual registrations of the feature point on the image provide samples of the geometric distortion mapping. With the samples of the distortion mapping collected over a region of image via experiments, appropriate interpolation scheme then can be applied to make approximation of the geometric distortion mapping. The measurement corrections then can be made according to the approximate local geometric distortion mapping.

The sampling-based method depends upon neither lens distortion models nor calibration methods, therefore it can be applied to the geometric distortion correction in general ways. The disadvantage of this method is that the experiments involves great effort and usually are limited in accuracy as well as in the number and spacing of the sample points, if expensive and accurate equipments are not available to the imaging system user.

A digital camera, or in general an electronic imaging system, has two major parts. The optical part is quite similar to that of an conventional camera. The sensing part is different. It is an opto-electronic sensor system. In recent years, novel technique closely related to the opto-electronic sensor technologies called computational sensors or smart sensors has emerged. Smart sensor methods are useful in enhancing the performance of sensors. A smart sensor consists a transducer combined with signal conditioning and other circuitry to produce output information signals that have been logically operated upon to increase the value of the information. At a higher level, the conversion-level smart sensors detect specific hard-to-measure parameters and covert that measurement to electrical signal. Sensors with environmental compensation and communication have further enhanced capabilities.

Smart sensing techniques have been applied to imaging sensor systems. For examples, focal plane array of circuits have been applied to imaging sensors which performs image processing while sensing. Some more advanced vision chips called "artificial retina" further implement machine vision algorithms on the sensing chip. These chips not only having functions of optical sensing, but also having functions of noise reduction, DC (direct current) component suppression, and contrast enhancing. In recent years, DSP (digital signal processor) has become a powerful tool in the smart sensor technologies.

In another related area, computer associative memory, which associate one data item to another data item for a large assembly of data set, are developed for various purposes, ranging from database applications to pattern recognition. The forms of associative memory can be computer memory look-up tables or artificial neural nets.

The current art of smart sensor techniques for electronic imaging is basically limited to enhancing the quality of electrical signals. The application of associative memory to imagery is mainly for feature extraction and pattern recognition, which are particular visual information processing tasks. These processing methods does not help for geometric distortion correction: Neither the local signal enhancement nor the local image feature extraction or pattern recognition processes can provide direct help for reducing image geometric distortion and thus enhancing the geometric quality of images.

SUMMARY OF THE INVENTION

The present invention provides a method and apparatus for determining and correcting the geometric distortion in electronic imaging systems.

In a distorted image, a picture element, which is also called a pixel, usually does not occupy the position determined by the pinhole camera external and internal orientation parameters. For each camera being manufactured, the geometric distortion mapping, a two dimensional vector valued function which maps the ideal pixel positions of scene points to their actual pixel registrations, namely, the actual location the scene point on the image, can be determined and memorized by a special device and with a special method. The memorized mapping can then be further used to map sensed intensity arrays into distortion corrected intensity arrays and generate images wherein said distortion is corrected.

The present invention is to provide a means to correct geometric distortion of the imaging system, thereby the images produced by the imaging system will have significantly reduced geometric distortion.

Accordingly, it is an object of this invention to provide a device for correcting the geometric distortions in the electronic imaging systems.

It is another object of this invention to provide a device and method for determining the geometric distortion mapping in the electronic imaging systems.

It is another object of this invention to provide a device for memorizing the determined geometric distortion mapping.

It is yet another object of this invention to provide a device and method to perform a geometric correction process by using memorized distortion mapping.

It is an object of this invention to provide a device and method for intensity array remapping thereby to generate distortion-corrected images.

BRIEF DESCRIPTION OF THE DRAWINGS

These and other features and advantages of the present invention will be more readily apprehended from the following detailed description when read in connection with the appended drawings, in which.

DETAILED DESCRIPTION OF AN ILLUSTRATIVE EMBODIMENT

An appreciation of the invention will be more readily gained by first noting with reference to FIG. 1 the principle of the electronic imaging. In the illustration, there is a two-dimensional (2-D) array of light sensing elements 4 presented to detect the spatial light intensity distribution in the image plane. When the shutter 3 of the camera is open, the object 1 is imaged by the optical lens 2 onto the surface of the 2-D detector array 4. The intensity distribution of the object is detected by all the detection elements. The detected intensity distribution is then stored in a memory buffer 5 which is built into the 2-D detector device 6.

Figure 3:
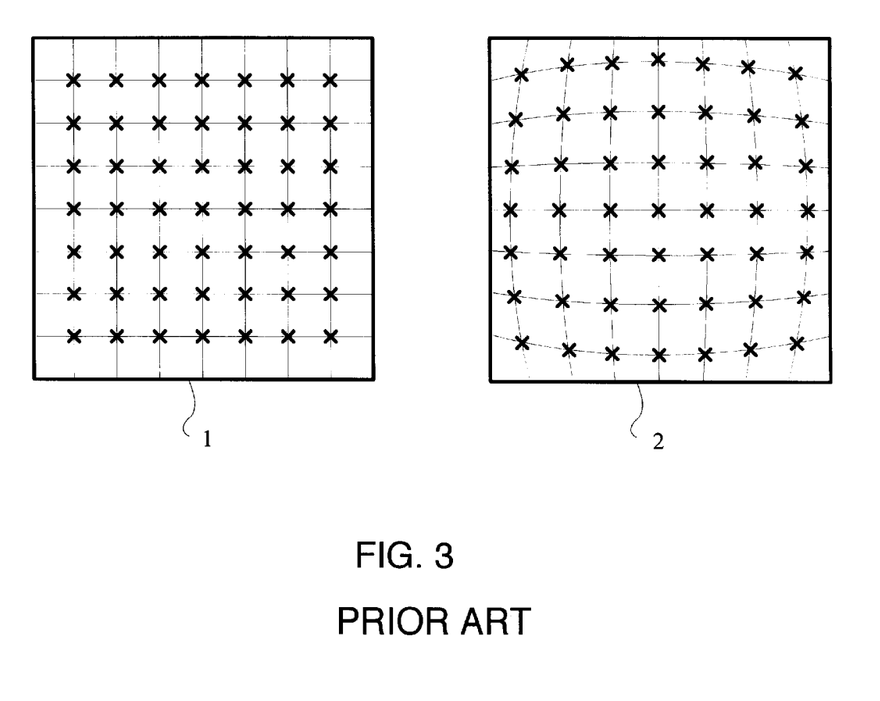
FIG. 3 is a diagram illustrating geometric distortion of images.

Without geometric distortion, the positions of the focused points are determined by the oblique angles of the beams and an ideal registration map 1 as shown in FIG. 3, should be obtained. However, due to the distortion, the actual registration of said focussed points may look like the one shown in map 2.

In accordance with this invention, and in this embodiment, a method for accurately measuring the geometric distortion involves a systematic sampling scheme of geometric distortion mapping and a special device called associative memory unit to memorize the taken sample. A geometric distortion sampling involves a sequence of single point mapping measurement. A single point mapping measurement determines two positions on the plane: the ideal position and the actual sensor registration. A single point mapping measurement is also called an example of the geometric distortion sampling, or simply called an example.

Figure 4:
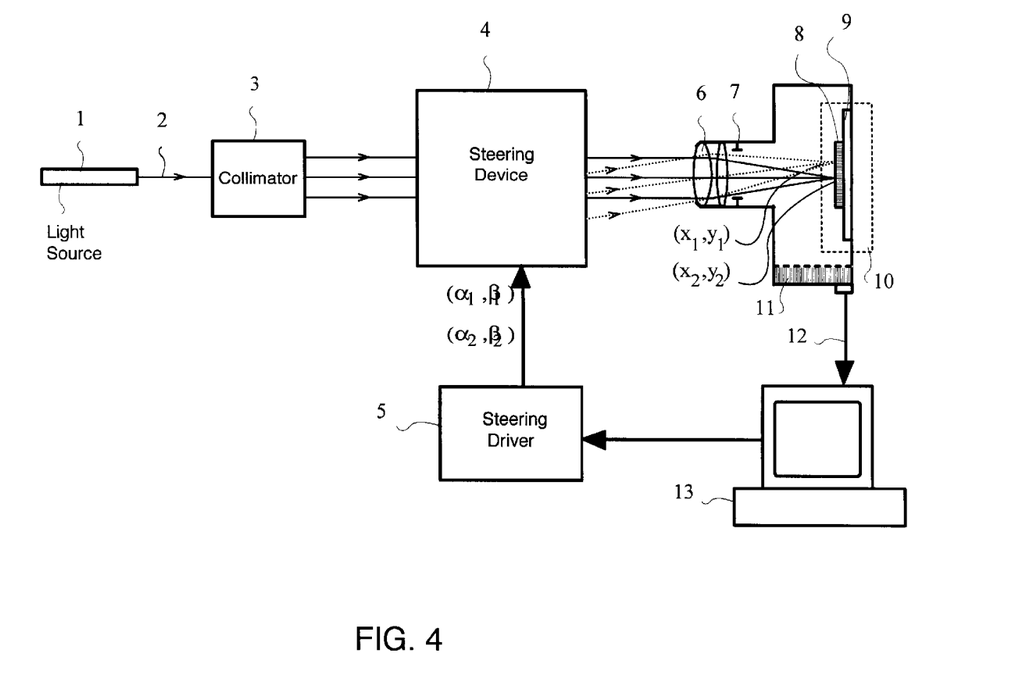
FIG. 4 is a schematic diagram of a geometric distortion measurement system in accordance with the present invention.

In accordance with the present invention, in this preferred embodiment, with reference to FIG. 4, there is depicted a system for geometric distortion sampling. With reference to FIG. 4, test light 2 from a light source 1 is collimated into a parallel beam by a collimator 3. In this preferred embodiment, the beam width is designed to be equal to or larger than the aperture of the optical lens of the electronic camera in order to minimize the diffraction effect. After passing through the optical lens 6, the parallel beam is focused into a point on the 2-D detector array. With reference to FIG. 4, a 2-D beam steering device 4 changes the oblique angle of the parallel beam. Each time the test light is on, there are two pixel locations: one derived according to pin-hole camera model from the oblique angle of the steering reflecting the ideal pixel location, the other is the location of actual sensor registration in the sensor array which response to the focused light signal.

The test light might focussed into a point in between sensor units. In this case, multiple sensor units will have response. Two method can be used to overcome the sensor position ambiguity. In the first method, a special feedback signal from sensor array can be used in controlling the steering device to adjusting the oblique angle of the test light in steps finer than the pixel pitch, which also called subpixel steps, until one sensor unit generates dominantly strong signal. The ideal pixel location and the actual pixel location will be recorded as one example pair. In the second method, the intensity detected by the neighboring pixels are compared to interpolate the actual location of the focused image point.

With further reference to FIG. 4, the oblique angle of the parallel beam is changed by the 2-D steering device. The exiting light beam from the 2-D beam steering device is then focused on the surface of the 2-D sensor array by the imaging lens 6. In accordance with the present invention, the 2-D beam steering device provides a means to scan the focused imaging point of the light beam on the surface of the 2-D sensor array. With reference to FIG. 4, when the driver 5 sends the beam steering angle of $(\alpha_1, \beta_1)$, the ideal image location will be $(x_1, y_1)$. Next, the beam steering angle $(\alpha_2, \beta_2)$ is sent to the beam steering device and the exiting angle will be steered to $(\alpha_2, \beta_2)$. The corresponding image location, ideally, will be $(x_2, y_2)$. While the ideal locations of the image points are predicted by the oblique angles of the exiting beams from the beam steering device, the actual locations are obtained by the coordinate of the sensing elements (i.e., the pixels) of the sensor upon which the image points fall. The ideal and actual image locations for a grid of image points are depicted in FIG. 3. Step by step, the process calculates for each of the predetermined sample points of the actual sensor units their ideal locations according to method 1; or according to method 2, for each of the predetermined ideal locations measures their actual registration positions. In this manner, a sample for geometric distortion mapping is obtained.

Figure 5:
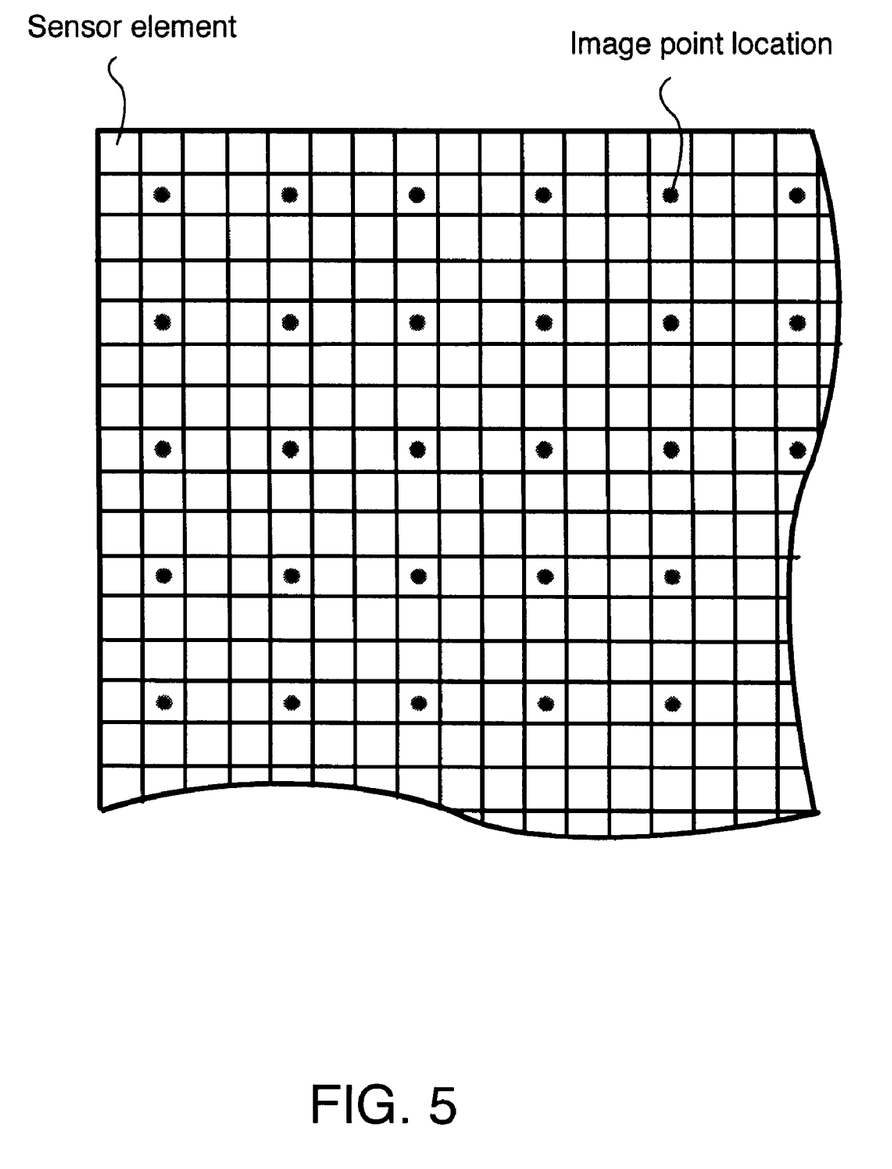
FIG. 5 is a diagram of illustrating in a preferred operation mode, a set of predetermined sensor elements are selected for the measurements of their ideal locations.

In accordance with the present invention, wherein two alternative methods are presented for providing examples of a sample of geometric distortion mapping, there are two operation modes in the process of geometric distortion sampling. In the first and preferred operation mode, with reference to FIG. 5, a matrix of the image point locations on the image sensor array is determined before the measurement. The scanning angle of the beam steering device is adjusted continuously or in subpixel steps. The detected light intensity of the sensor array is passed to a controller, which can be a controlling computer. As shown in FIG. 4, the scanning signal sent to the beam steering driver 5 is derived by the controller 13 from the detected intensities of response signals of sensor units the image detector array 10 via the data link 12. With reference to FIG. 5, the beam is scanned until only the sensor element at the predetermined location, which marked as image points, detects a light intensity that is higher than certain threshold, and all its neighboring elements detect intensity levels lower than the threshold. The actual image location is then given by the coordinate of this sensor element. The oblique angle of the exiting beam from the beam steering device is recorded via the readings from the driver. And the ideal location of the image point is further calculated from the oblique angle. By establishing the ideal and actual image location pairs for all the predetermined measurement points, the lens distortion can be derived via interpolation.

Figure 6:
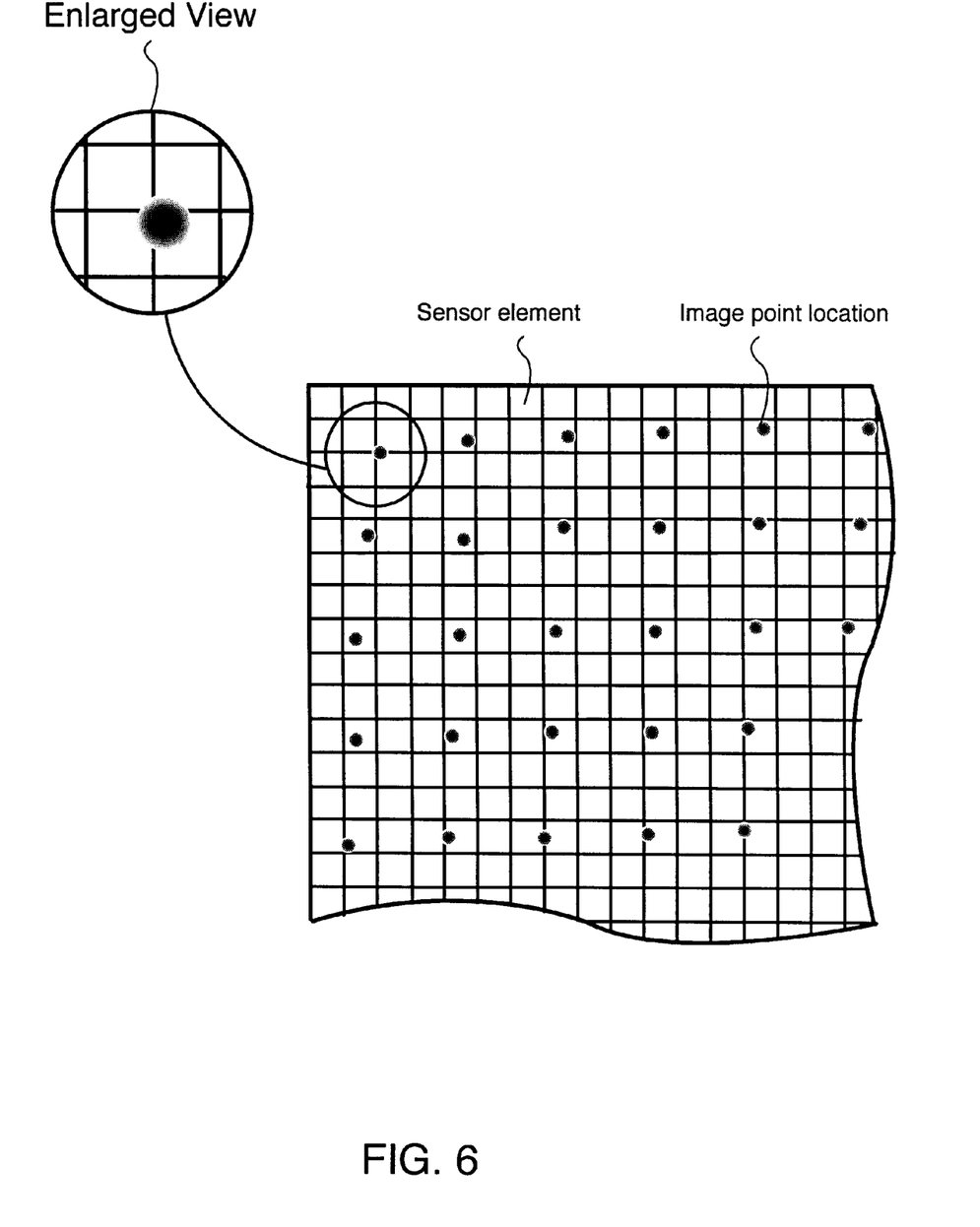
FIG. 6 is a diagram of illustrating in an alternative operation mode, a set of pixel locations are determined according to the sensor responses to a predetermined set of ideal locations.

Alternatively, in the second operation mode, the scanning angle of the beam steering device can scan in integer steps. Thus, the ideal image point locations will be a 2-D grid. Due to the lens distortion, the actual image point locations will be different. The image point usually does not fall within only one sensor element. With reference to FIG. 6, in the inset, there is depicted a situation in which the image point of a steered parallel beam falls at the boundaries of four sensor elements. If the 2-D sensor array has a high intensity uniformity or its intensity uniformity is measured and calibrated, however, the exact location of the image point can be derived from the intensity levels detected by these four sensor elements. Therefore, by scanning over all the predetermined measurement points, a sample of geometric distortion can be obtained.

Figure 7:
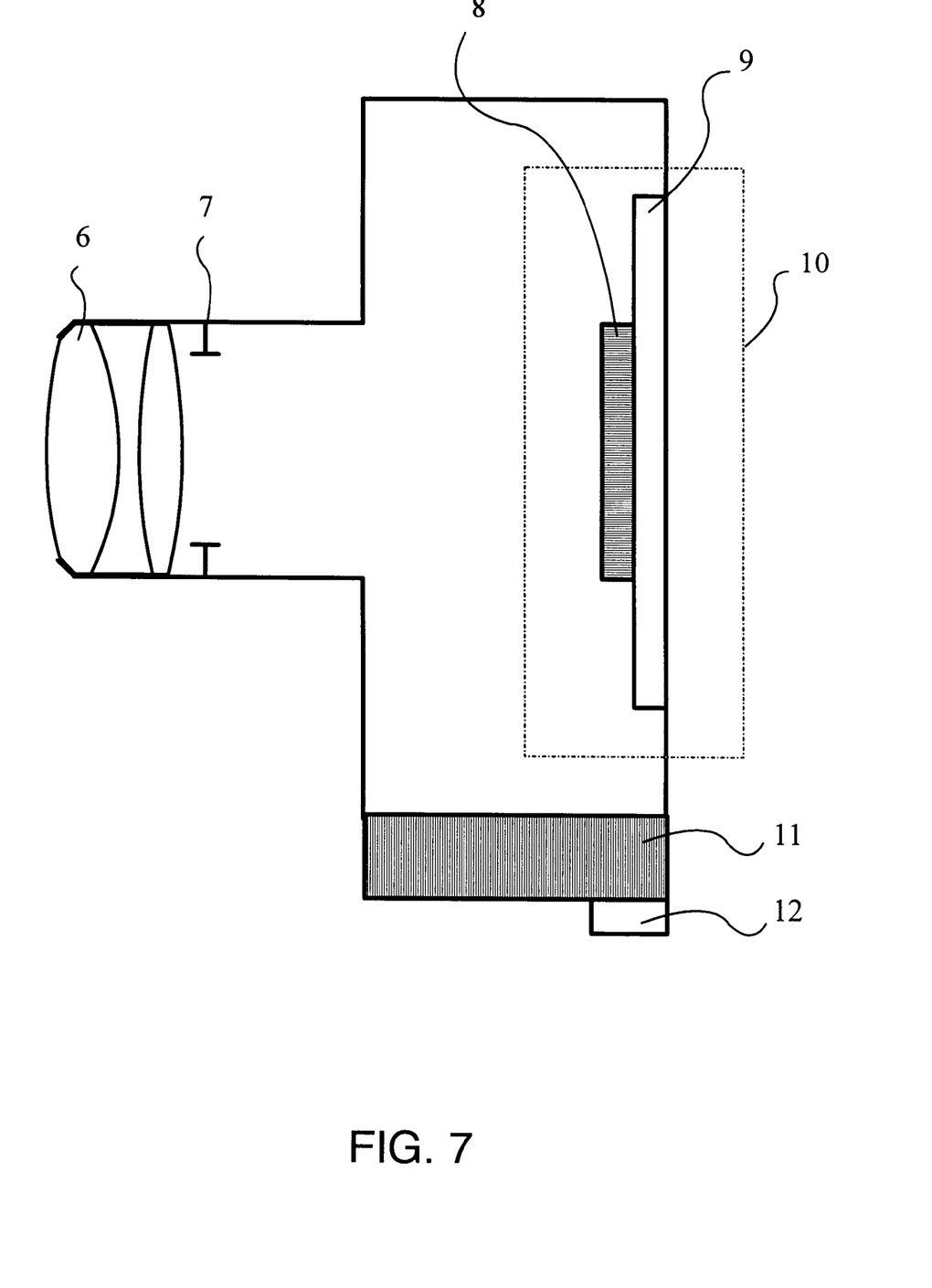
FIG. 7 is a schematic diagram of a digital camera with augmented geometric distortion corrector.

According to the present invention, there depicted in FIG. 7 a schematic diagram of a digital camera. With reference to FIG. 7, like a regular digital camera, a digital camera with geometric distortion correction unit comprises a lens 6, a shutter 7, a 2-D image detector array 10, which further comprising a built-in memory buffer 9 and a 2-D intensity sensor array 8. However, between the build-in memory buffer 9 and data link adaptor 12, there is a geometric distortion-correction unit 11.

Figure 8:
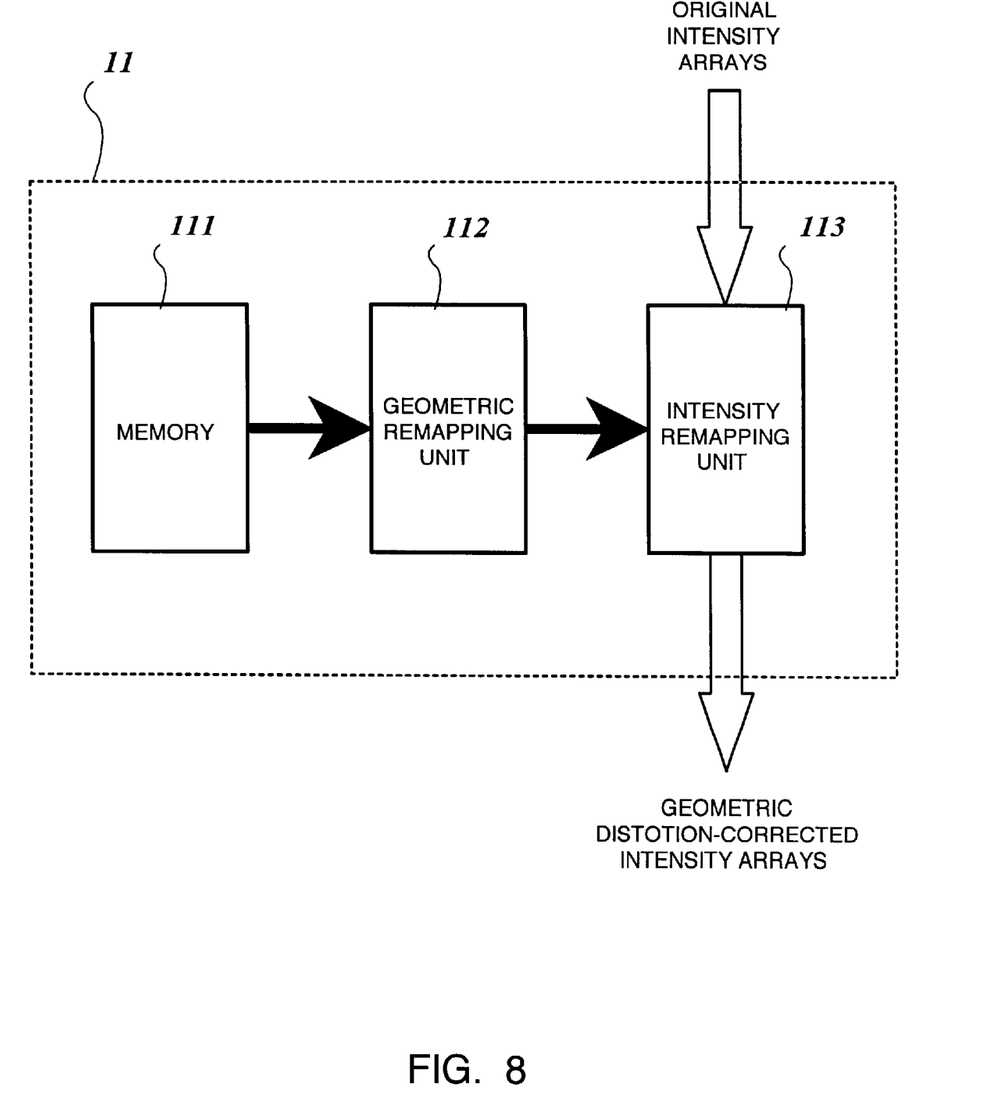
FIG. 8 is a schematic diagram of a geometric distortion corrector for taking original intensity arrays from the two dimensional image detector array and remapping them to geometric distortion-corrected intensity arrays, in accordance with the present invention.

According to the present invention, there depicted in FIG. 8 a schematic diagram of a geometric distortion-correction unit 11. With reference to FIG. 8, a geometric distortion correction unit comprises an associative memory unit 111 for maintaining the information of a sample of the geometric distortion mapping, a geometric remapping unit 112 which assigns for each pixel location of an image the actual registration location by using the information maintained in the associative memory and some adopted location interpolation scheme, and an intensity remapping unit 113 which assigns for each pixel location a corrected intensity value based on the actual sensor registration location for that pixel location, the original intensities array from image detection array, and by using some adopted intensity interpolation scheme.

With reference to FIG. 4, in accordance with the present invention, during the process of a geometric distortion sampling, the controller 13 writes each example into associative memory within the geometric distortion correction unit 11. The sampling process, along with the location interpolation scheme of the geometric remapping unit in the geometric distortion correction system, will completely determine a geometric distortion mapping in the electronic imaging system.

The image produced by an electronic imaging system equipped with a geometric distortion-correction device stored with a sample of its geometric distortion mapping will generate geometric distortion-corrected images. The present invention also applies to color digital cameras when light sources of three wavelengths (for example, red, green and blue light sources) are used.

Although the present invention has been described with reference to a preferred embodiment, the invention is not limited to the details thereof. Various modifications and substitutions will occur to those of ordinary skill in the art, and all such modifications and substitutions are intended to fall within the spirit and scope of the invention as defined in the appended claims.

What is claimed is:

1. A geometric distortion correction system in an electronic imaging system for generating geometric distortion-corrected images comprising:
    (a) a geometric distortion measurement means for determining a geometric distortion mapping of said electronic imaging system;
    (b) an associative memory means for maintaining the information of a sample of geometric distortion mapping of said electronic imaging system;
    (c) a geometric remapping means coupled to said associative memory means for receiving the information of the stored sample of the geometric distortion mapping, and for generating an actual sensor registration location for each pixel location of an image detector array of said electronic imaging system; and
    (d) an intensity remapping means coupled to the image detector array of said electronic imaging system and said geometric remapping means, for receiving intensity arrays from the image detector array and said actual sensor registration location from said geometric remapping means for each pixel location, and for providing geometric distortion corrected intensity arrays to a memory buffer of the electronic imaging system, wherein said geometric distortion measurement means further comprising
    (a1) a light source connected to an electrical source for providing light signals;
    (a2) collimator means for receiving said light signals from said light source, and for providing distant images of said light signals;
    (a3) two-dimensional beam steering means for receiving said distant images of said light signals, and for providing distant images of said light signals with oblique angles; and
    (a4) geometric distortion measurement control means coupled to said electronic imaging system and said two-dimensional beam steering means for receiving sensor array response signal patterns from said electronic imaging system, and for providing steering command signal to said two-dimensional beam steering means, and for providing said associative memory means of said geometric distortion correction system the sample of geometric distortion mapping of said electronic imaging system.

2. The system of claim 1, wherein said geometric remapping means comprising a grid point registration assign means coupled to said associative memory means for assign to each integer grid point on an image plane of its actual sensor registration location.

3. The system of claim 2, wherein said intensity remapping means comprising a grid point intensity assign means coupled to said image detector array of said electronic imaging system and said grid point registration assign means for assigning to each integer grid point on the image plane its corrected intensity.

4. The system of claim 1, wherein said two-dimensional beam steering means further comprising a steering driver for receiving, memorizing, and amplifying said steering command signal from said geometric distortion measurement control means.

5. The system of claim 4, wherein said geometric distortion measurement control means comprising oblique angle signal adjustment means for providing incremental changes of said distant images of said light signals with oblique angles.

6. The system of claim 5, wherein said geometric distortion measurement control means comprising thresholding means for terminating a single point mapping measurement process and making record of the oblique angles upon each termination of said single point mapping measurement process.

7. The system of claim 6, wherein said geometric distortion measurement control means further comprising locating means for receiving said record of oblique angles and intensity arrays from each termination and determining an ideal location and the actual sensor registration location of the sample point.

8. The system of claim 1 wherein the geometric distortion mapping of said electronic imaging system comprising the steps of:
    (a) initializing a geometric distortion sampling process;
    (b) performing said single point measurement process for each sample point specified by said geometric distortion sampling process;
    (c) determining for each sample point the ideal location and the actual sensor registration location upon termination of said single point measurement process;
    (d) making association for each pair of said ideal location and actual sensor registration location, and writing said association into said associative memory means; and (e) terminating the geometric distortion sampling process.

9. The system of claim 8, wherein said step of initializing further comprising the steps of:
 (a) turning on and adjusting the light source;
 (b) selecting an operation mode;
 (c) selecting sample points.

10. The system of claim 9, wherein said step of selecting an operation mode further comprising step of selecting termination threshold of said single point measurement process and steering said two-dimensional beam steering means.

11. The system of claim 10, wherein said step of performing said single point measurement process further comprises steps of providing subpixel increments of oblique angle steering when operating in a first and preferred mode.

12. The system of claim 10, wherein said step of determining the actual sensor registration location upon termination further comprising the steps of using geometric interpolation scheme when operating in a second and alternative mode.

* * * * *